US010739639B2

(12) United States Patent
Wu et al.

(10) Patent No.: US 10,739,639 B2
(45) Date of Patent: Aug. 11, 2020

(54) BACKLIGHT APPARATUS

(71) Applicant: DARFON ELECTRONICS CORP., Taoyuan (TW)

(72) Inventors: Ming-Yen Wu, Taoyuan (TW); Yen-Fu Chou, Taoyuan (TW); Wen-Jui Chiang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 72 days.

(21) Appl. No.: 16/240,805

(22) Filed: Jan. 7, 2019

(65) Prior Publication Data

US 2019/0339573 A1    Nov. 7, 2019

(30) Foreign Application Priority Data

May 3, 2018   (TW) .............................. 107115068 A

(51) Int. Cl.
| | |
|---|---|
| *G02F 1/1335* | (2006.01) |
| *G09G 3/34* | (2006.01) |
| *H05B 45/00* | (2020.01) |
| *G02F 1/13357* | (2006.01) |

(52) U.S. Cl.
CPC .. *G02F 1/133611* (2013.01); *G02F 1/133603* (2013.01); *G02F 1/133606* (2013.01); *G09G 3/3426* (2013.01); *H05B 45/00* (2020.01)

(58) Field of Classification Search
CPC .. G02F 1/133; G02F 1/1335; G02F 1/133611; G02F 1/133603; G02F 1/133606; G09G 3/34; G09G 3/3426; H05B 45/00; H05B 45/10; H05B 45/20; H05B 45/34
See application file for complete search history.

(56) References Cited

U.S. PATENT DOCUMENTS

| | | | |
|---|---|---|---|
| 5,200,763 A | * | 4/1993 | Tanuma ..................... B41J 2/45 347/237 |
| 7,633,577 B2 | | 12/2009 | Moon |
| 9,232,587 B2 | | 1/2016 | Williams |
| 2008/0002102 A1 | | 1/2008 | Lee |

(Continued)

FOREIGN PATENT DOCUMENTS

| | | |
|---|---|---|
| CN | 100430795 C | 11/2008 |
| CN | 101660692 B | 8/2014 |

(Continued)

*Primary Examiner* — Jimmy T Vu
(74) *Attorney, Agent, or Firm* — Winston Hsu

(57) ABSTRACT

A backlight apparatus includes a circuit board, a control board, and a connection cable connecting the above components. A first light source driver and a second light source driver are disposed on the circuit board and are electrically connected to a plurality of first light sources and a plurality of second light sources respectively. A connector is disposed on the circuit board. The first and second light source drivers are individually electrically coupled in series to the connector. The control board outputs electrical power, a first data stream, and a second data stream. The first light source driver controls the plurality of first light sources to light individually according to the first data stream. The second light source driver controls the plurality of second light sources to light individually according to the second data stream. Thereby, the circuit board can control the operation of the light sources individually.

8 Claims, 12 Drawing Sheets

(56) References Cited

U.S. PATENT DOCUMENTS

| | | |
|---|---|---|
| 2010/0052564 A1 | 3/2010 | Park |
| 2011/0096099 A1 | 4/2011 | Yamamoto |
| 2012/0056561 A1 | 3/2012 | Adachi |
| 2012/0074847 A1 | 3/2012 | Shimomura |
| 2015/0301781 A1* | 10/2015 | Ekkaia .................. G06F 3/1446 |
| | | 362/237 |
| 2017/0068362 A1 | 3/2017 | Den Boer |

FOREIGN PATENT DOCUMENTS

| | | |
|---|---|---|
| CN | 103680411 B | 10/2015 |
| KR | 10-0903822 B1 | 6/2009 |
| KR | 10-2012-0036661 A | 4/2012 |
| WO | 2011083634 A1 | 7/2011 |

* cited by examiner

BACKLIGHT APPARATUS

BACKGROUND OF THE INVENTION

1. Field of the Invention

The present invention relates to a backlight apparatus, and more particularly to a direct-type backlight apparatus.

2. Description of the Prior Art

Conventional direct-type backlight apparatuses use a plurality of light sources (e.g. Light Emitting Diode, LED) disposed uniformly to provide back light, e.g. for liquid crystal panels. These light sources are usually controlled to emit light under the same operation condition, e.g. driven by the same current. When the luminous efficiency of some light sources decays, the uniformity of the back light will be insufficient. It is possible to replace the LEDs with decayed luminous efficiency directly for overcoming this problem. However, it is quite inconvenient. For this issue, there are some solutions by which the light sources can be controlled to emit light individually. They usually use a plurality of light source drivers. Each light source driver can control several light sources to operate. Thereby, the uniformity of the backlight can be adjusted by controlling each light source through the corresponding light source driver. However, if the light source drivers and the light sources are disposed on different carrier boards, they need to be connected by a cable in principle. The quantity of the conductors of the cable will be proportional to the quantity of the light sources, which increases the assembly difficulty. For a reduction in the quantity of the conductors, it is practicable to dispose the light source drivers and the light sources on the same carrier board and use another control board to transmit control data to the light source driver. In general, the light source drivers on the same carrier board use the same signal loop on which the light source drivers are electrically connected in series, so that the control flexibility on the operation of the light sources reduces.

SUMMARY OF THE INVENTION

The present disclosure provides a backlight apparatus, of which light source drivers and light sources are disposed on the same circuit board. The light source drivers are connected in series by several signal loops. Thereby, the design of the backlight apparatus can reduce the quantity of conductors of a connection cable used in the backlight apparatus and is flexible to the control on the light sources.

A backlight apparatus according to the present invention includes a circuit board, a plurality of first light sources, a first light source driver, a plurality of second light sources, a second light source driver, a connector, a connection cable, and a control board. The circuit board has a first front surface, a first rear surface, a plurality of first vias, a plurality of second vias, a plurality of first driving signal paths, and a plurality of second driving signal paths. The plurality of first driving signal paths pass through the plurality of first vias correspondingly to extend on the first front surface. The plurality of second driving signal paths pass through the plurality of second vias to extend on the first front surface. The plurality of first light sources are disposed on the first front surface. The plurality of first light sources correspond to the plurality of first driving signal paths respectively. The first light source driver is disposed on the first rear surface and electrically coupled to the plurality of first light sources through the corresponding first driving signal paths. The first light source driver has a first input port and a first output port. The plurality of second light sources are disposed on the first front surface. The plurality of second light sources correspond to the plurality of second driving signal paths respectively. The second light source driver is disposed on the first rear surface and electrically coupled to the plurality of second light sources through the corresponding second driving signal paths. The second light source driver has a second input port and a second output port. The connector is disposed on the first rear surface and has a first connection port, a second connection port, a third connection port, and a fourth connection port. The first connection port, the first input port, the first output port, and the second connection port are electrically coupled in series. The third connection port, the second input port, the second output port, and the fourth connection port are electrically coupled in series. The control board is disposed adjacent to the circuit board and connected to the circuit board through the connection cable. The control board outputs electrical power, a first data stream, a second data stream through the connection cable. Therein, the first input port receives the first data stream through the first connection port. The first output port transmits the first data stream transmit to the second connection port. The first light source driver decodes the first data stream to obtain a first control signal and controls the plurality of first light sources to emit light through the corresponding first driving signal paths according to the first control signal. The second input port receives the second data stream through the third connection port. The second output port transmits the second data stream transmit to the fourth connection port. The second light source driver decodes the second data stream to obtain a second control signal and controls the plurality of second light sources to emit light through the corresponding second driving signal paths according to the second control signal.

Thereby, the backlight apparatus according to the present invention can control the operation of the first and second light sources individually. The control on the light sources can be achieved by use of less conductors of the connection cable than the quantity of the light sources. Furthermore, the first light source drivers are electrically connected in series in a different signal loop from that in which the second light source drivers are electrically connected in series. The first and second light source drivers receive the data streams through the corresponding signal loops. Thereby, the control flexibility on the light sources is improved. In other words, the design of the backlight apparatus according to the present invention can reduce the quantity of conductors of a connection cable used in the backlight apparatus and is flexible to the control on the light sources.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
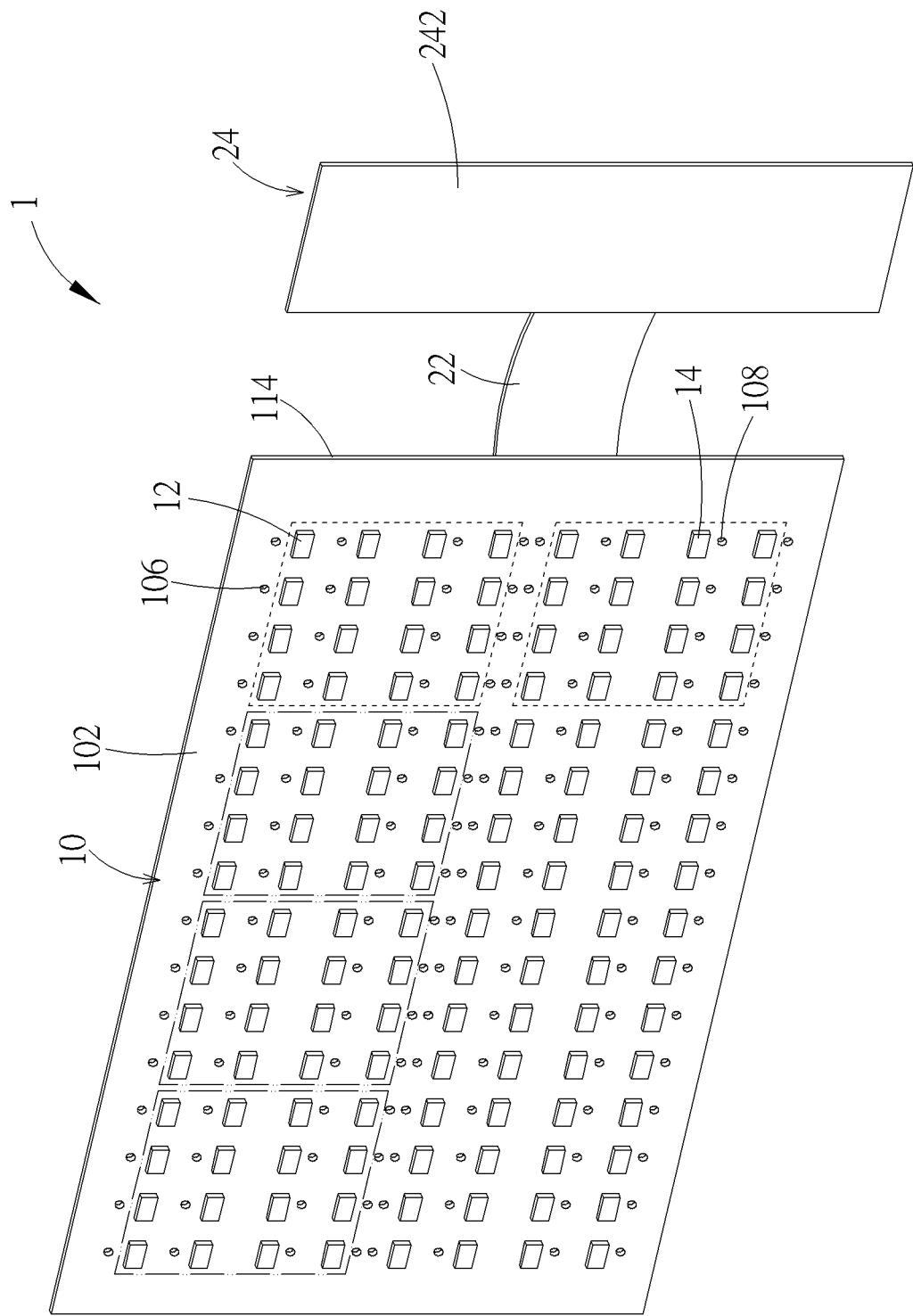
FIG. 1 is a front view of a backlight apparatus according to an embodiment.
Figure 2:
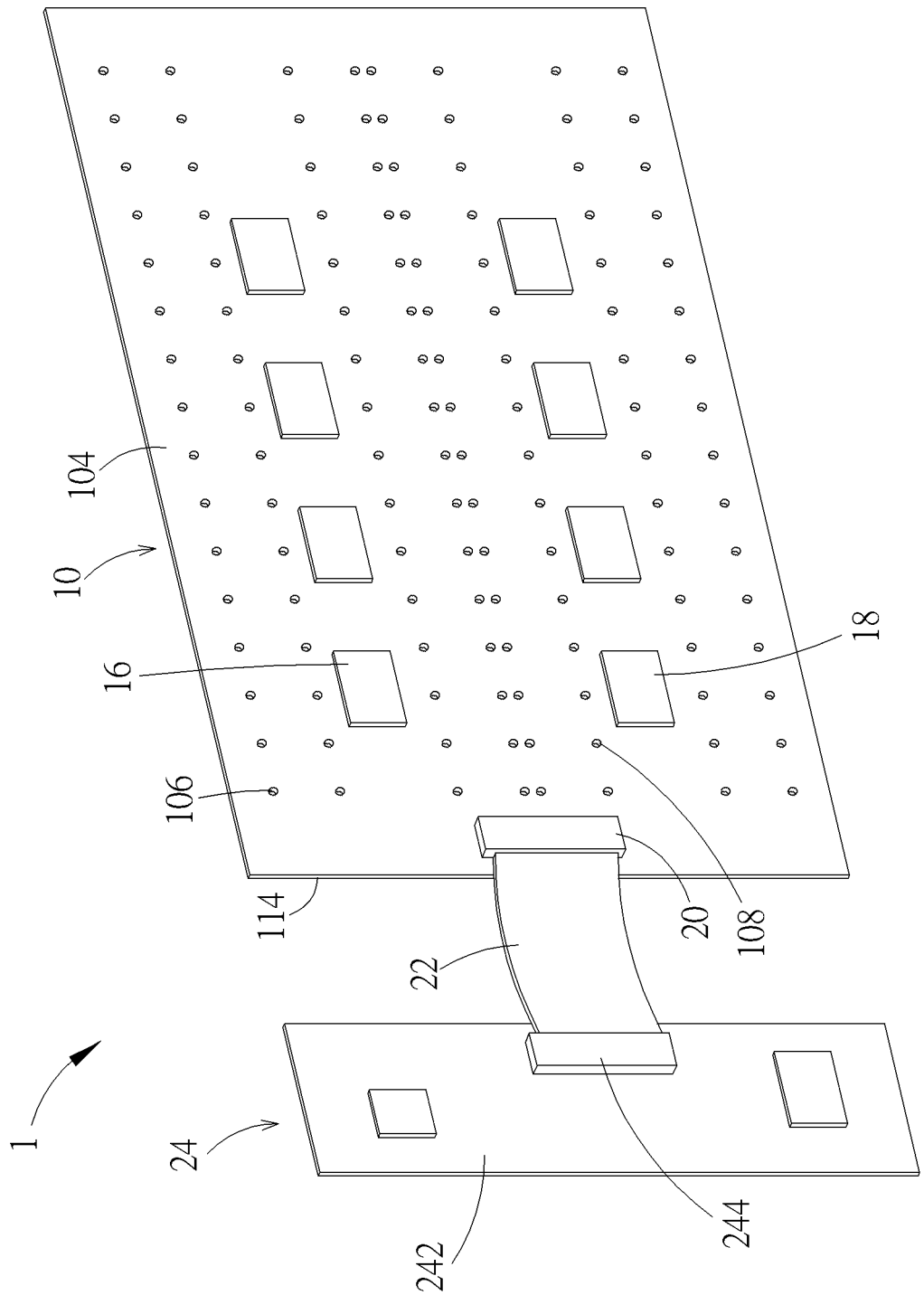
FIG. 2 is a rear view of the backlight apparatus in FIG. 1.
Figure 3:
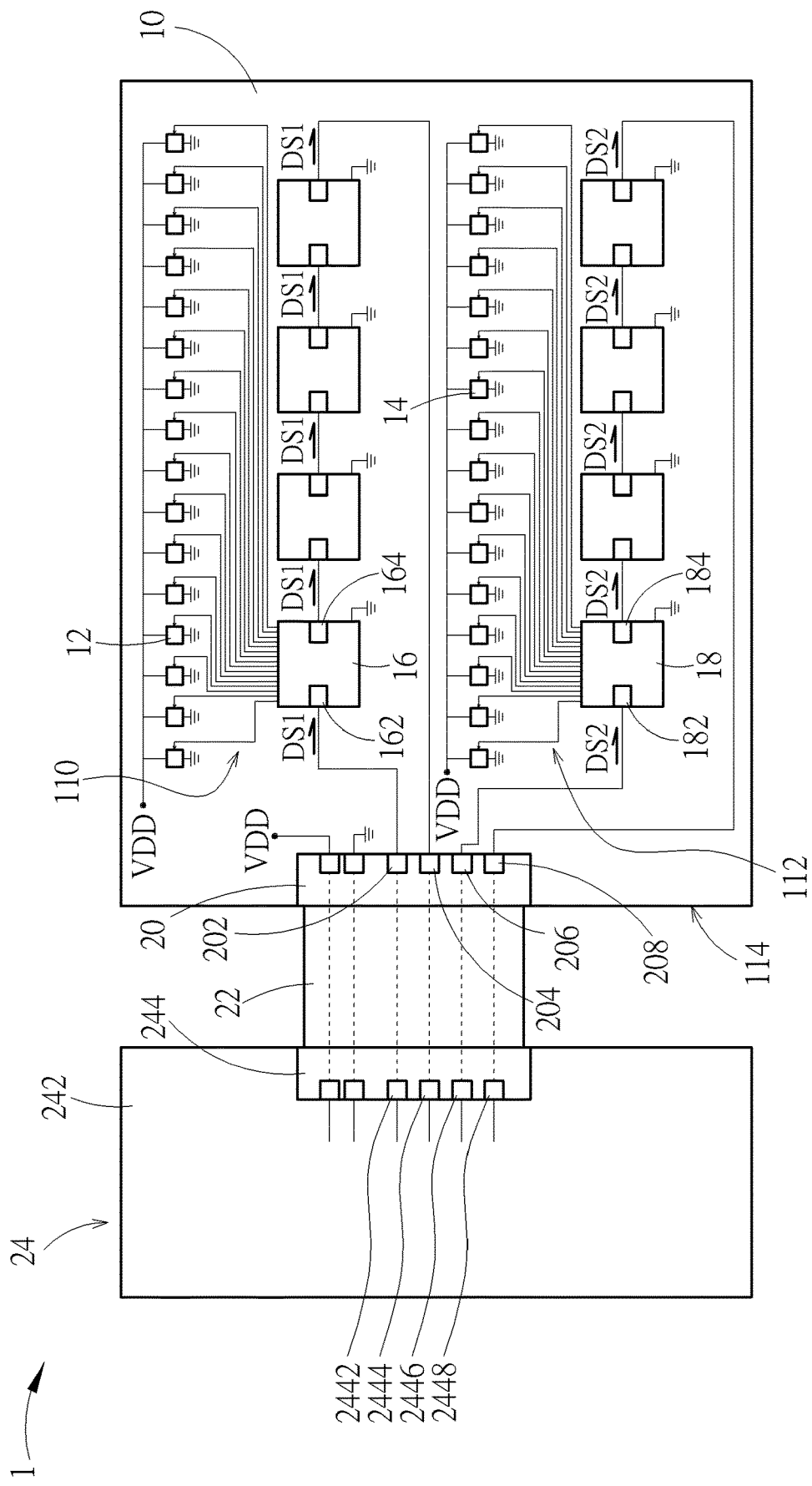
FIG. 3 is a functional block diagram of the backlight apparatus in FIG. 1.

Please refer to FIG. 1 to FIG. 3. A backlight apparatus 1 according to an embodiment includes a first circuit board 10, a plurality of first light sources 12 (of which the disposition area is indicated by a dashed rectangle in FIG. 1), a plurality of second light sources 14 (of which the disposition area is indicated by a dashed rectangle in FIG. 1), a first light source driver 16, a second light source driver 18, a first connector 20, a first connection cable 22, and a control board 24. The first light sources 12, the second light sources 14, the first light source driver 16, the second light source driver 18, and the first connector 20 are disposed on the first circuit board 10. The control board 24 provides required electrical power and control signals for operation through the first connection cable 22. In practice, for an example of a liquid crystal display with the backlight apparatus 1, the backlight apparatus 1 can further include other optical components (e.g. diffusing sheets, prism sheets, and so on) disposed above the first light sources 12 and the second light sources 14. For another example, the backlight apparatus 1 can be applied in other display devices that need backlight.

In the embodiment, the first circuit board 10 has a first front surface 102, a first rear surface 104, a plurality of first vias 106, a plurality of second vias 108, a plurality of first driving signal paths 110, and a plurality of second driving signal paths 112. The first driving signal paths 110 pass through the first vias 106 correspondingly to extend on the first front surface 102. The second driving signal paths 112 pass through the second vias 108 correspondingly to extend on the first front surface 102. The first light sources 12 are on the first front surface 102. Each first light source 12 corresponds to one of the first driving signal paths 110. The first light source driver 16 is disposed on the first rear surface 104 and electrically coupled to the first light sources 12 through the corresponding first driving signal paths 110. The second light source 14 is disposed on the first front surface 102. Each second light source 14 corresponds to one of the second driving signal paths 112. The second light source driver 18 is disposed on the first rear surface 104 and electrically coupled to the second light sources 14 through the corresponding second driving signal paths 112.

In practice, the first driving signal paths 110 and the second driving signal paths 112 will be more complicated as the first light sources 12 and the second light sources 14 increase in quantity. It is practicable to use a multi-layer board as the first circuit board 10 for meeting layout requirement therefor. Therein, the first driving signal paths 110 extend from the first rear surface 104 to the first front surface 102. In practice, the first driving signal paths 110 may be distributed on a plurality of conductive layers and pass through a plurality of vias (may including through holes, blind holes, and buried holes), which can be realized by techniques of printed circuit boards and will not be described in addition. In principle, each via corresponds to only one conductive line, so the above first via 106 can refer to one of at least one via through which the corresponding first driving signal path 110 passes. Furthermore, if the layout complexity of the first driving signal path 110 and the second driving signal path 112 is not so difficult that the first circuit board 10 can be provided by a double-sided board, the first driving signal path 110 can pass through only one via in principle. The via is regarded as the corresponding first via 106 and extends to (or connects) the first front surface 102 and the first rear surface 104, that is, passing through the first circuit board 10. The location of the first via 106 in FIG. 1 and FIG. 2 is just for reference. In addition, the above description of the first vias 106 and the first driving signal paths 110 is also applicable to the second vias 108 and the second driving signal paths 112 and will not be repeatedly described.

Figure 4:
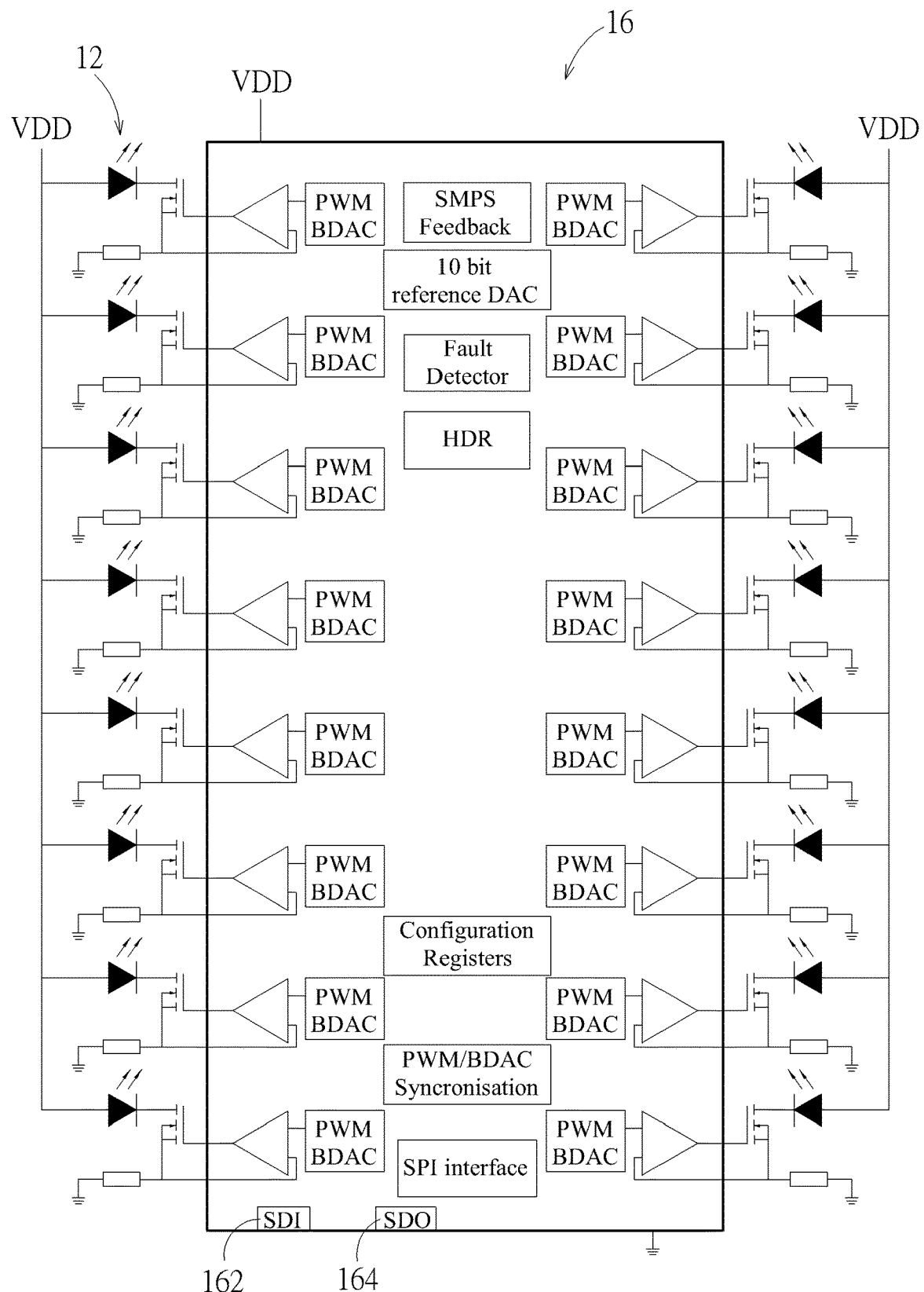
FIG. 4 is a functional block diagram of a first light source driver of the backlight apparatus in FIG. 1.

Furthermore, the first connector 20 is disposed on the first rear surface 104 and electrically coupled to the first light source driver 16 and the second light source driver 18. The control board 24 is disposed adjacent to the first circuit board 10 and includes a carrier board 242, a first mating connector 244 and other electronic components (e.g. microprocessor, AC-to-DC converter, DC-to-DC converter) which are disposed on the carrier board. The first mating connector 244 and the first connector 20 matches with each other and are connected through the first connection cable 22. For example, the first connection cable 22 can be realized by but not limited to a flexible flat cable (FPC); correspondingly, the first mating connector 244 and the first connector 20 are realized by an FPC board connector respectively. Thereby, the control board 24 outputs electrical power, a first data stream DS1, and a second data stream DS2 to the first connector 20 through the first connection cable 22. Then, the first light sources 12, the second light sources 14, the first light source driver 16, and the second light source driver 18 can receive required electrical power through the first connector 20 and also can receive the first data stream DS1 and the second data stream DS2 through the first connector 20. Therein, the first light source driver 16 decodes the first data stream DS1 to obtain a relevant first control signal for controlling the operation of the first light sources 12 individually. The second light source driver 18 decodes the second data stream DS2 to obtain a relevant second control signal for controlling the operation of the second light sources 14 individually. For more details, in practice, the first connector 20 has a first connection port 202, a second connection port 204, a third connection port 206, and a fourth connection port 208. The first light source driver 16 has a first input port 162 and a first output port 164. The first connection port 202, the first input port 162, the first output port 164, and the second connection port 204 are electrically coupled in series. In the embodiment, there are several light source drivers connected in series between the first light source driver 16 and the second connection port 204. These light source drivers (including the first light source driver 16) are coupled in series, e.g. by a common serial-peripheral interface daisy chain configuration. Therein, the control board 24 is regarded as the host of the serial-peripheral interface daisy chain configuration in logic. The first connector 20 has other connection ports (now labelled in the figures) for providing clock signal, chip selection signal, and so on. In the embodiment, there are four light source drivers (including the first light source driver 16) electrically coupled in series between the first connection port 202 and the second connection port 204. An exemplary disposition area of the light sources electrically coupled to the first light source driver 16 is indicated by a dashed rectangle in FIG. 1. The other exemplary disposition areas of the light sources electrically coupled to the light source drivers (except for the first light source driver 16) are indicated by rectangles in chain lines in FIG. 1. In practice, if the series connection includes only the first light source driver 16, in principle, the first input port 162 is directly connected to the first connection port 202, and the first output port 164 is directly connected to the second connection port 204. Similarly, the second light source driver 18 has a second input port 182 and a second output port 184. The third connection port 206, the second input port 182, the second output port 184, and the fourth connection port 208 are electrically coupled in series. The electrical connection of the second light source driver 18 with the first connector 20 is equal to the electrical connection of the first light source driver 16 with the first connector 20. Therefore, for other descriptions about the second light source driver 18, please refer to the foregoing, which will not be described in addition. Furthermore, in practice, the first light source driver 16 can be realized by the function block diagram shown by FIG. 4 and electrically couples with the sixteen first driving signal paths 110 to control the sixteen first light sources 12 to emit light in different luminous brightness, which also can be applied to the second light source driver 18 and will not be repeatedly described. Therein, in FIG. 4, the first light source 12 includes a light emitting diode. In practice, the first light source 12 can include several light emitting diodes disposed closely, of which the luminous brightness is substantially the same.

Furthermore, in the embodiment, the first mating connector 244 has a first mating connection port 2442, a second mating connection port 2444, a third mating connection port 2446, and a fourth mating connection port 2448 which are connected to the first connection port 202, the second connection port 204, the third connection port 206, and the fourth connection port 208 through the first connection cable 22 respectively. The first data stream DS1 is transmitted to the first connection port 202 through the first mating connection port 2442 and the first connection cable 22. The first input port 162 receives the first data stream DS1 through the first connection port 202. The first output port 164 transmits the first data stream DS1 to the second connection port 204. According to the first data stream DS1, the first light source driver 16 controls the first light sources 12 through the corresponding first driving signal paths 110 to emit light. The first data stream DS1 is then transmitted to the second mating connection port 2444 through the second connection port 204 and the first connection cable 22. Similarly, the second data stream DS2 is transmitted to the third connection port 206 through the third mating connection port 2446 and the first connection cable 22. The second input port 182 receives the second data stream DS2 through the third connection port 206. The second output port 184 transmits the second data stream DS2 to the fourth connection port 208. According to the second data stream DS2, the second light source driver 18 controls the second light sources 14 through the corresponding second driving signal paths 112 to emit light. The second data stream DS2 is then transmitted to the fourth mating connection port 2448 through the fourth connection port 208 and the first connection cable 22.

In the configuration of the backlight apparatus 1, the first light sources 12, the second light sources 14, the first light sources driver 16, and the second light source driver 18 are disposed on the first circuit board 10, so the required conductors of the first connection cable 22 is obviously less than the connection lines of the first light source driver 16 and the second light source driver 18 with the first light sources 12 and the second light sources 14 respectively in quantity. It is conducive to avoidance of or reduction on the difficulty of assembly and is also conducive to reduction on the manufacture cost. Furthermore, although the first light sources 12 and the second light sources 14 are disposed on the first circuit board 10, the first light sources 12 and the second light sources 14 still can be controlled individually to emit light according to the first data stream DS1 and the second data stream DS2 respectively.

Figure 5:
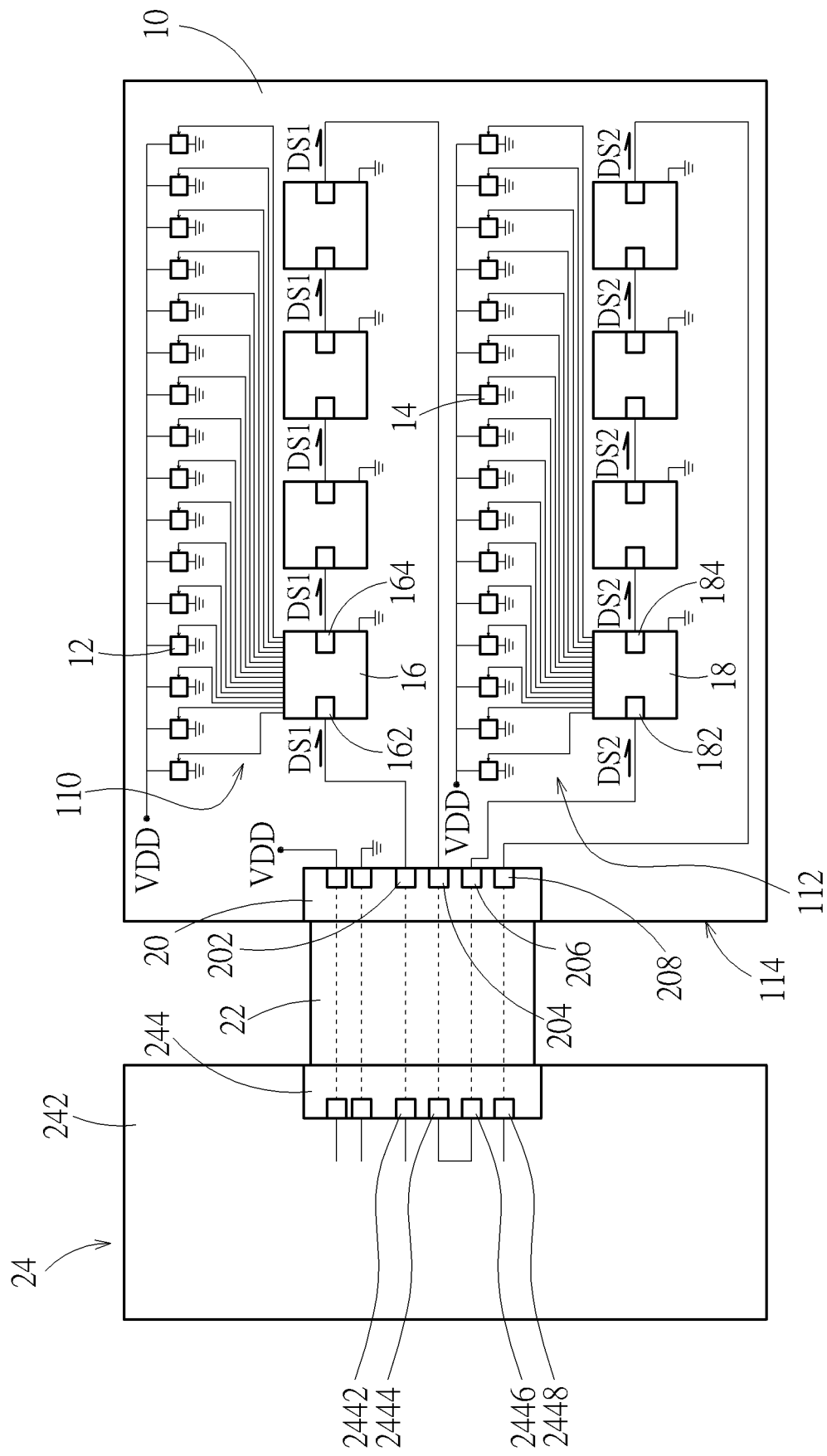
FIG. 5 is a functional block diagram of the backlight apparatus in FIG. 1 applied in an application.

In practice, if (a) the first control signal for controlling the lighting of the first light source 12 and (b) the second control signal for controlling the lighting of the second light source 14 are required to be contained in the same data stream, the control board 24 can make the first data stream DS1 and the second data stream DS2 be the same by conducting nodes of the circuit on the control board 24. As shown by FIG. 5, in the backlight apparatus 1 of the embodiment, the second mating connection port 2444 and third mating connection port 2446 can be connected (e.g. by a jumper), so that after transmitted from the second connection port 204 to the second mating connection port 2444, the first data stream DS1 is transmitted to the third connection port 206 through the third mating connection port 2446 (i.e. after transmitted from the first circuit board 10 to the control board 24, the first data stream DS1 is transmitted from the control board 24 to the first circuit board 10 as the second data stream DS2) for the second light source driver 18 to decode to obtain the second control signal for controlling the second light sources 14 to emit light according thereto. In this case, the first light source driver 16 and the second light source driver 18 are electrically coupled in series. Thereby, the backlight apparatus 1 of the embodiment has the flexibility of circuit design to be able to control the operation of all light sources (including the first light sources 12 and the second light sources 14) by use of single one data stream (DS1) or several data steams (DS1+DS2), even without changing the circuitry and the disposition of the components on the first circuit board 10.

Figure 7:
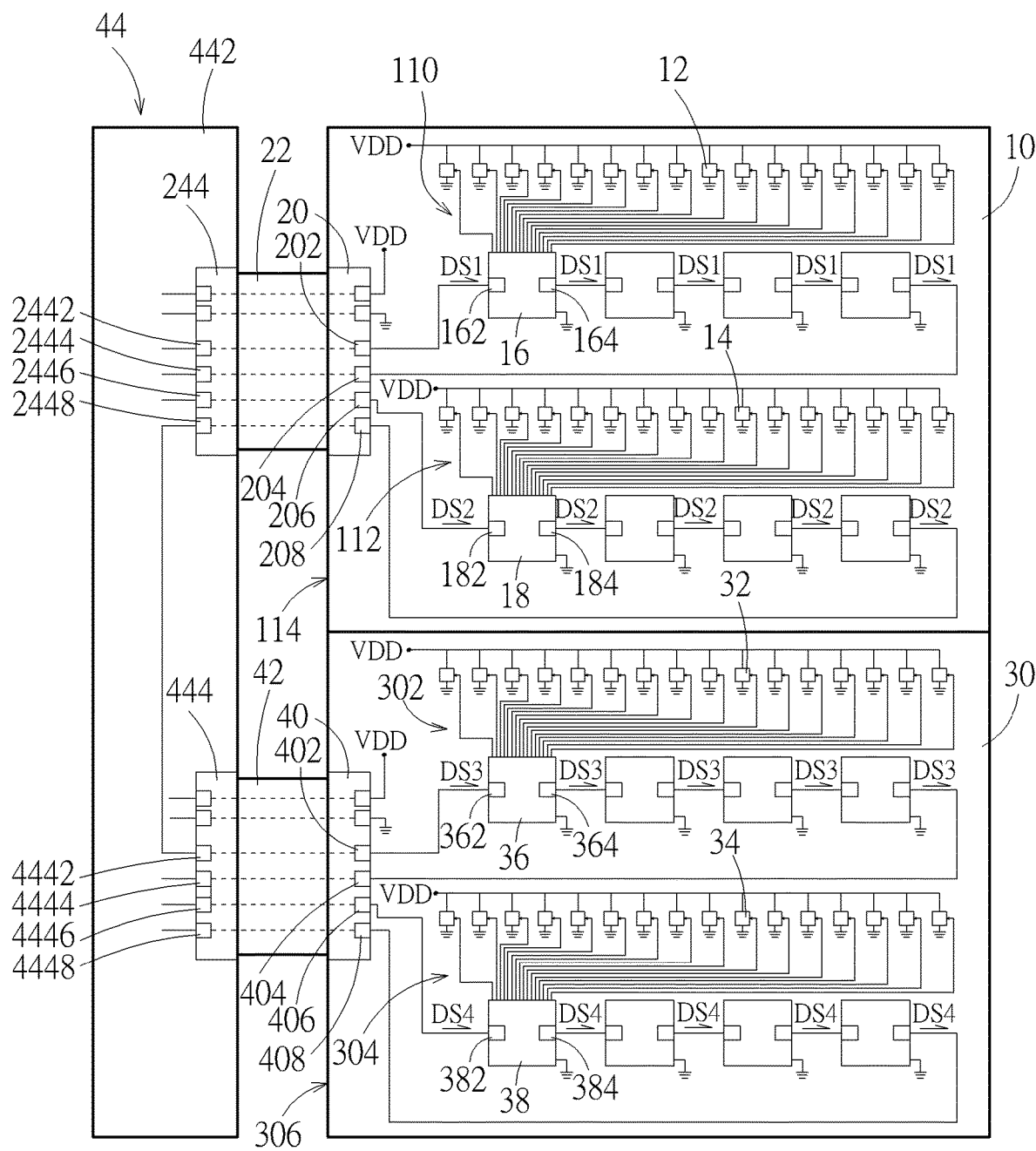
FIG. 7 is a functional block diagram of the backlight apparatus in FIG. 6 applied in an application.

Please refer to FIG. 7, which illustrates a backlight apparatus 3 of another embodiment. The backlight apparatus 3 is structurally equal to an expansion of the backlight apparatus 1. For simplification of description, the backlight apparatus 3 uses the reference numbers of the backlight apparatus 1 in principle. For other descriptions about the backlight apparatus 3, please refer to the relevant descriptions of the components of the backlight apparatus 1 in the same name, which will not be repeatedly described. Compared with the backlight apparatus 1, the backlight apparatus 3 further includes a second circuit board 30, a plurality of third light sources 32, a plurality of fourth light sources 34, a third light source driver 36, a fourth light source driver 38, a second connector 40, and a second connection cable 42. The control board 44 of the backlight apparatus 3 further includes a second mating connector 444 disposed on the carrier board 442 thereof and matching the second connector 40. The second circuit board 30 has a second front surface, a second rear surface, a plurality of third vias, a plurality of fourth vias, a plurality of third driving signal paths 302, and a plurality of fourth driving signal paths 304. The third driving signal paths 302 pass through the third vias correspondingly to extend on the second front surface. The third light sources 32 are disposed on the second front surface and correspond to the third driving signal paths 302 respectively. The third light source driver 36 is disposed on the second rear surface and electrically coupled to the third light sources 32 through the corresponding third driving signal paths 302. The fourth driving signal path 304 pass through the fourth vias correspondingly to expand on the second front surface. The fourth light sources 34 are disposed on the second front surface and correspond to the fourth driving signal paths 304 respectively. The fourth light source driver 38 is disposed on the second rear surface and electrically coupled to the fourth light sources 34 through the corresponding fourth driving signal paths 304. The second connector 40 is disposed on the second rear surface and has a fifth connection port 402, a sixth connection port 404, a seventh connection port 406, and an eighth connection port 408. The third light source driver 36 has a third input port 362 and a third output port 364. The fifth connection port 402, the third input port 362, the third output port 364, and the sixth connection port 404 are electrically coupled in series. The fourth light source driver 38 has a fourth input port 382 and a fourth output port 384. The seventh connection port 406, the fourth input port 382, the fourth output port 384, and the eighth connection port 408 are electrically coupled in series. In the embodiment, the second circuit board 30 is structurally equal to the first circuit board 10 in principle. The connection relationship of the second circuit board 30 with other components thereon is similar to that of the first circuit board 10 with other components thereon. Therefore, for other descriptions about the second circuit board 30 and the other components thereon (including the connection relationship thereof), please refer to the relevant descriptions of the first circuit board 10 and the other components thereon (including the connection relationship thereof) and the relevant figures.

Furthermore, the second connection cable 42 connects the second connector 40 and the second mating connector 444. The second mating connector 444 has a fifth mating connection port 4442, a sixth mating connection port 4444, a seventh mating connection port 4446, and an eighth mating connection port 4448, which correspond to the fifth connection port 402, the sixth connection port 404, the seventh connection port 406, and the eighth connection port 408 respectively and are connected to thereto through the second connection cable 42. The control board 44 outputs electrical power, a third data stream DS3, and a fourth data stream DS4 to the second connector 40 through the second connection cable 444. The third input port 362 receives the third data stream DS3 through the fifth connection port 402. The third output port 364 transmits the third data stream DS3 to the sixth connection port 404. The third light source driver 36 decodes the third data stream DS3 to obtain a relevant third control signal for controlling the third light sources 32 to emit light through the corresponding third driving signal paths 302 according to the third control signal. The fourth input port 382 receives the fourth data stream DS4 through the seventh connection port 406. The fourth output port 384 transmits the fourth data stream DS4 to the eighth connection port 408. The fourth light source driver 38 decodes the fourth data stream DS4 to obtain a relevant fourth control signal for controlling the fourth light sources 34 to emit light through the corresponding fourth driving signal paths 304 according to the fourth control signal.

Furthermore, in the backlight apparatus 3, the first circuit board 10 and the second circuit board 30 are arranged side by side. The first circuit board 10 has a first edge 114. The second circuit board 30 has a second edge 306. The first edge 114 is aligned with the second edge 306. In other words, the first circuit board 10 and the second circuit board 30 are spliced in logic to form a circuit board with larger area. Furthermore, the first connector 20 is disposed adjacent to the first edge 114. The second connector 40 is disposed adjacent to the second edge 306. The control board 44 is disposed adjacent to the first edge 114 and the second edge 306. Thereby, the first connection cable 22 and the second connection cable 42 are not required to be long in length, which is conducive to cost reduction and the disposition of the components. Furthermore, on the whole, the backlight apparatus 3 uses the control board 44 to control two circuit board modules (i.e. the first circuit board 10 with the components thereon and the second circuit board 30 with the components thereon). The backlight apparatus 1 uses the control board 24 to control one circuit board module (i.e. the first circuit board 10 with the components thereon). Therefore, the backlight apparatus 3 is an expansion of the backlight apparatus 1 in structure, e.g. applicable for liquid crystal displays of larger size. Therefore, the backlight apparatuses according to the invention have a modularization property, which is conducive to the production design and is also conducive to reduction on the manufacture cost.

Figure 6:
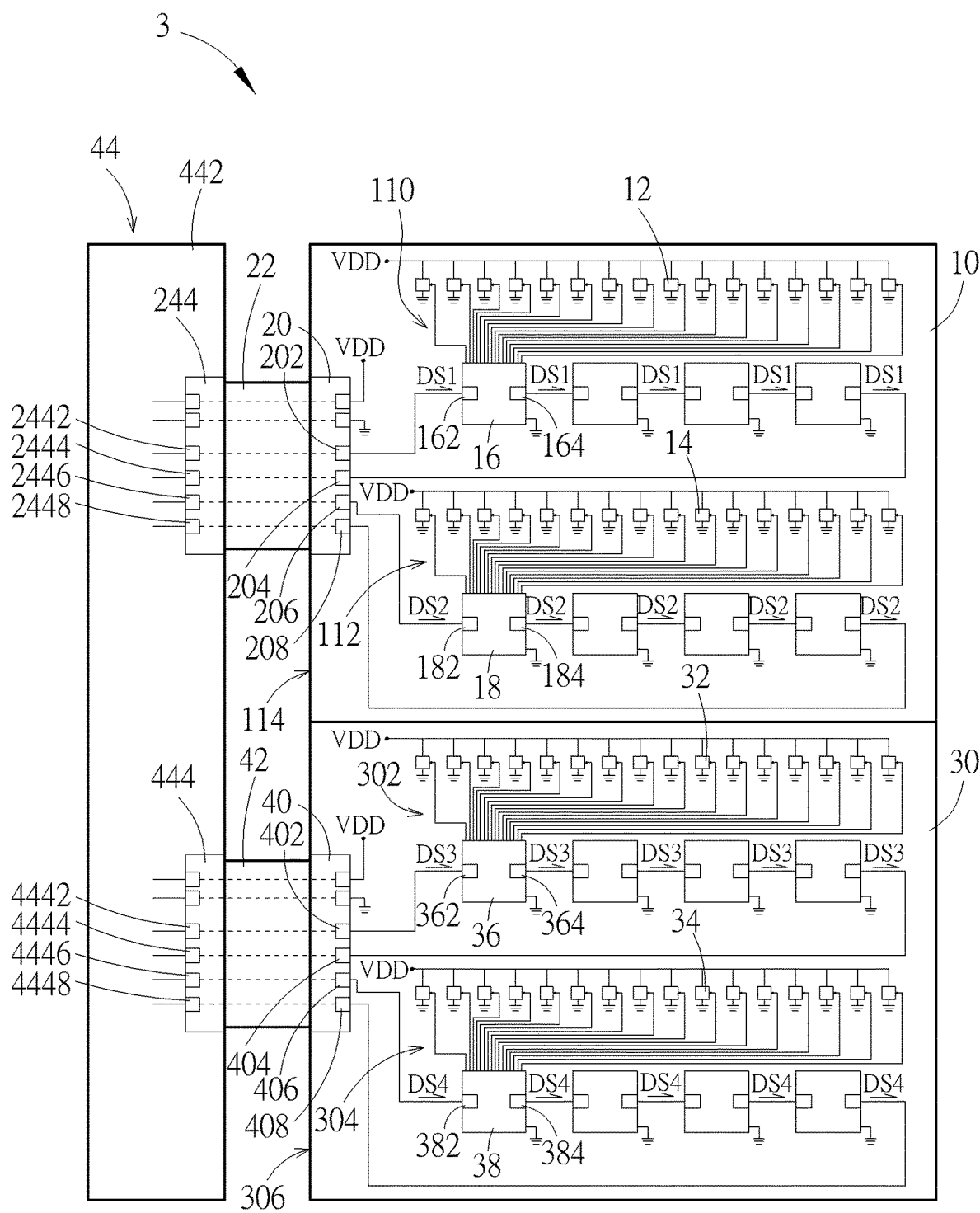
FIG. 6 is a functional block diagram of a backlight apparatus according to another embodiment.

Furthermore, in the backlight apparatus 3 shown by FIG. 6, connecting mating connection ports on the control board 44 can achieve electrical series connection of the light source drivers in practice. For example, in FIG. 6, if the second mating connection port 2444 and the third mating connection port 2446 are connected and the first control signal and the second control signal are coded into the first data stream DS1, the first light source driver 16 and the second light source driver 18 are electrically coupled in series accordingly and the first light sources 12 and the second light sources 14 are controlled to emit light according to the first data stream DS1.

For another example, as shown by FIG. 7, if the fourth mating connection port 2448 and the fifth mating connection port 4442 are connected and the second control signal and the third control signal are coded into the second data stream DS2, the second light source driver 18 and the third light source driver 36 are electrically coupled in series accordingly and the second light sources 14 and the third light sources 32 are controlled to emit light according to the second data stream DS2; in other words, the second data stream DS2 is also taken as the third data stream DS3.

Figure 8:
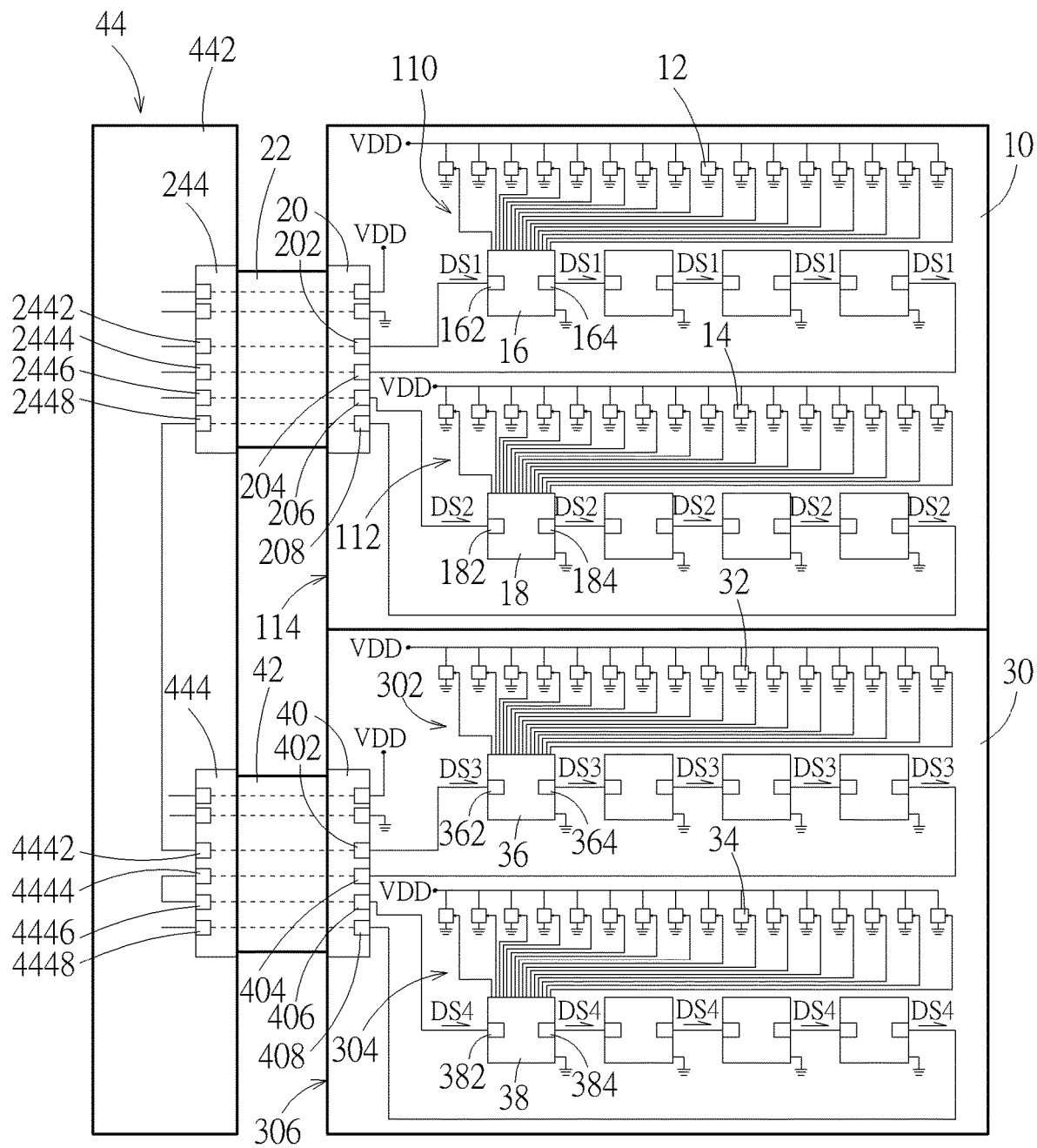
FIG. 8 is a functional block diagram of the backlight apparatus in FIG. 6 applied in another application.

For another example, as shown by FIG. 8, the fourth mating connection port 2448 and the fifth mating connection port 4442 are connected. The sixth mating connection port 4444 and the seventh mating connection port 4446 are connected. The second to fourth control signals are coded into the second data stream DS2. Thereby, the second light source driver 18, the third light source driver 36, and the fourth light source driver 38 are electrically coupled in series. The second light sources 14, the third light sources 32, and the fourth light sources 34 are controlled to emit light according to the second data stream DS2. In other words, the second data stream DS2 is also taken as the third data stream DS3 and the fourth data stream DS4.

Figure 9:
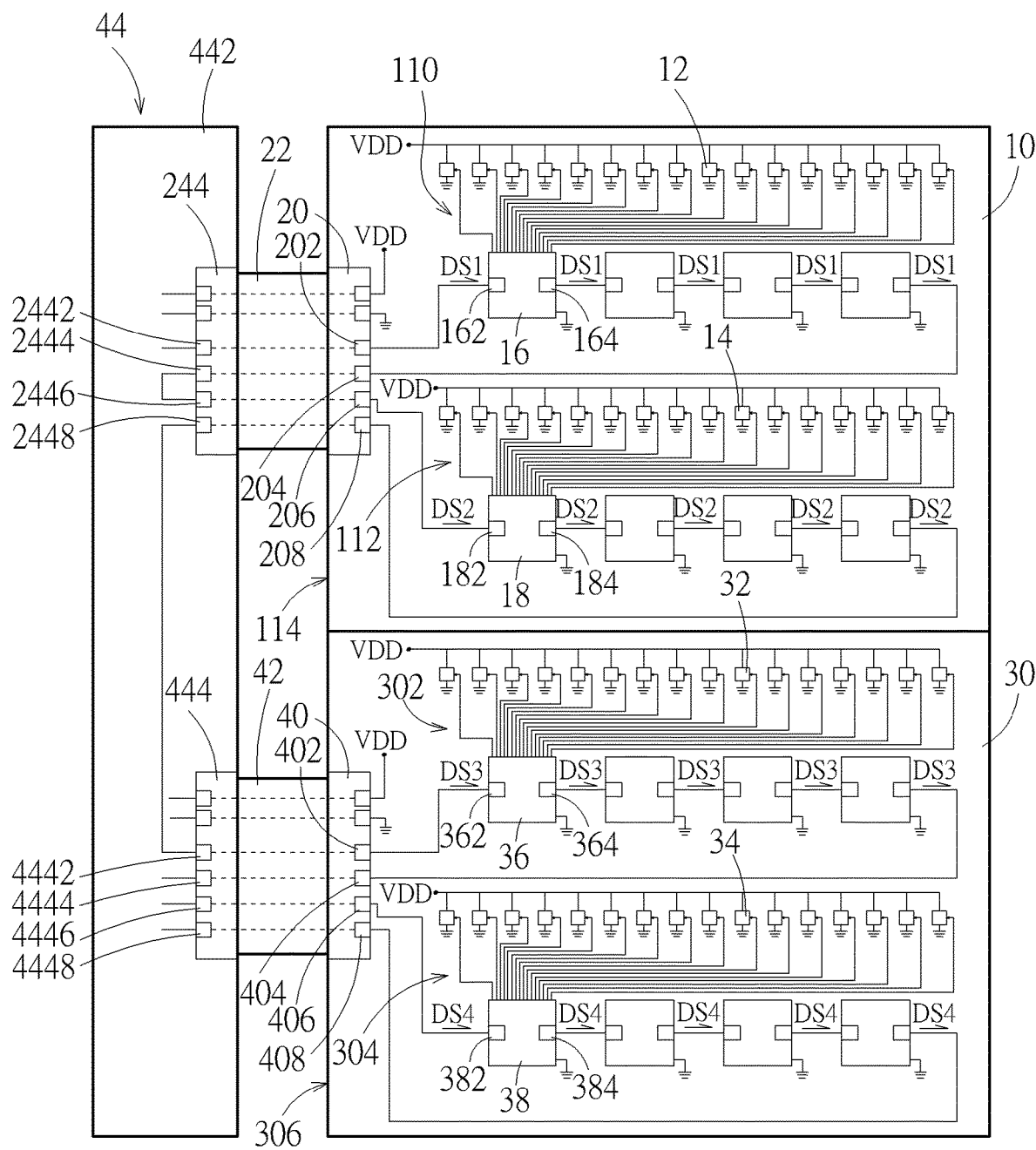
FIG. 9 is a functional block diagram of the backlight apparatus in FIG. 6 applied in another application.

For another example, as shown by FIG. 9, the second mating connection port 2444 and the third mating connection port 2446 are connected. The fourth mating connection port 2448 and the fifth mating connection port 4442 are connected. The first to third control signals are coded into the first data stream DS1. Thereby, the first light source driver 16, the second light source driver 18, and the third light source driver 36 are electrically coupled in series. The first light sources 12, the second light sources 14, and the third light sources 32 are controlled to emit light according to the first data stream DS1. In other words, the first data stream DS1 is also taken as the second data stream DS2 and the third data stream DS3.

Figure 10:
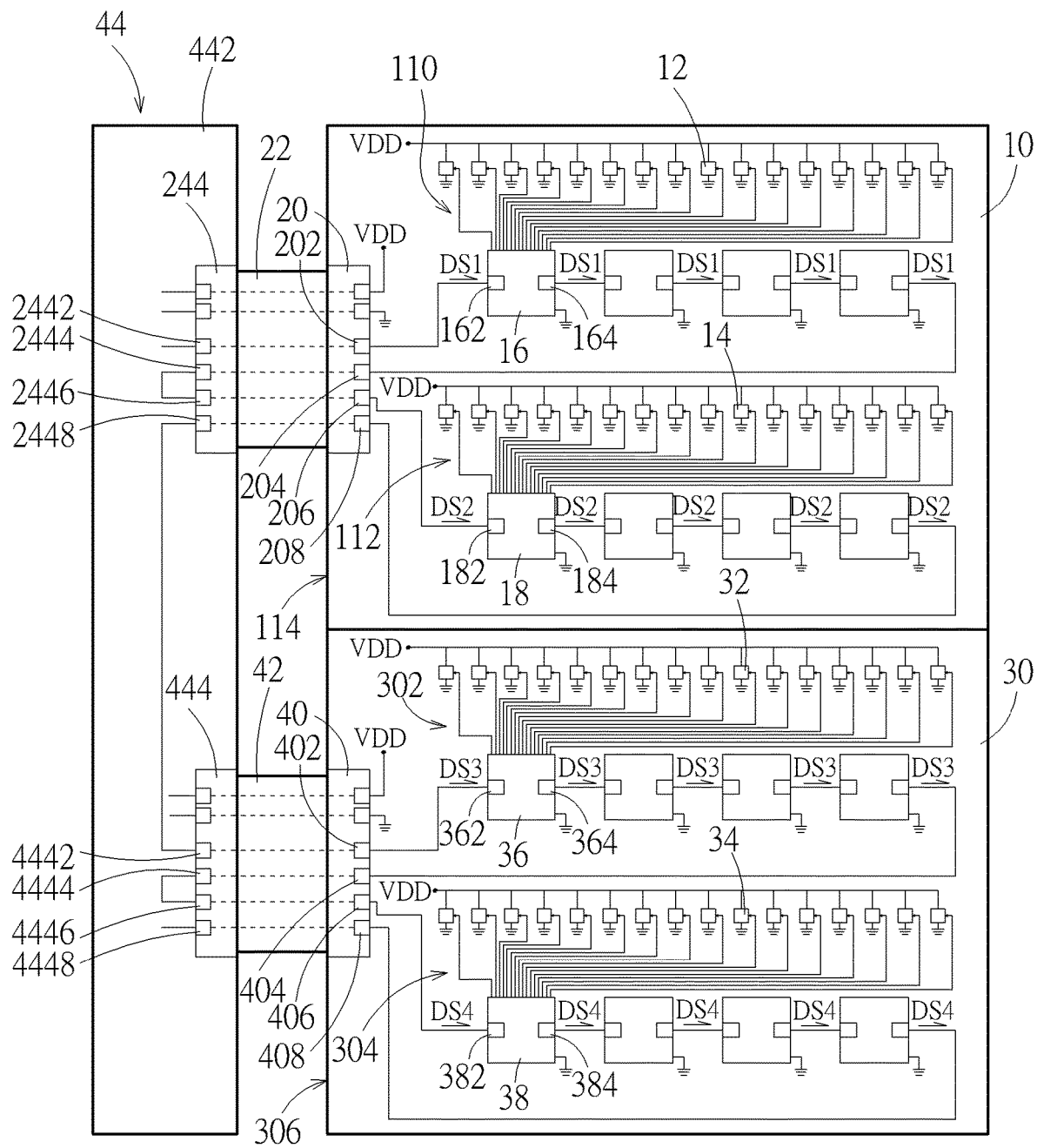
FIG. 10 is a functional block diagram of the backlight apparatus in FIG. 6 applied in another application.

For another example, as shown by FIG. 10, the second mating connection port 2444 and the third mating connection port 2446 are connected. The fourth mating connection port 2448 and the fifth mating connection port 4442 are connected. The sixth mating connection port 4444 and the seventh mating connection port 4446 are connected. The first to fourth control signals are coded into the first data stream DS1. Thereby, the first light source driver 16, the second light source driver 18, the third light source driver 36, and the fourth light source driver 38 are electrically coupled in series. The first light source 12, the second light source 14, the third light source 32, and the fourth light source 34 are controlled to emit light according to the first data stream DS1. In other words, the first data stream DS1 contains the second to fourth control signals originally contained in the second data stream DS2, the third data stream DS3, and the fourth data stream DS4 respectively.

Figure 11:
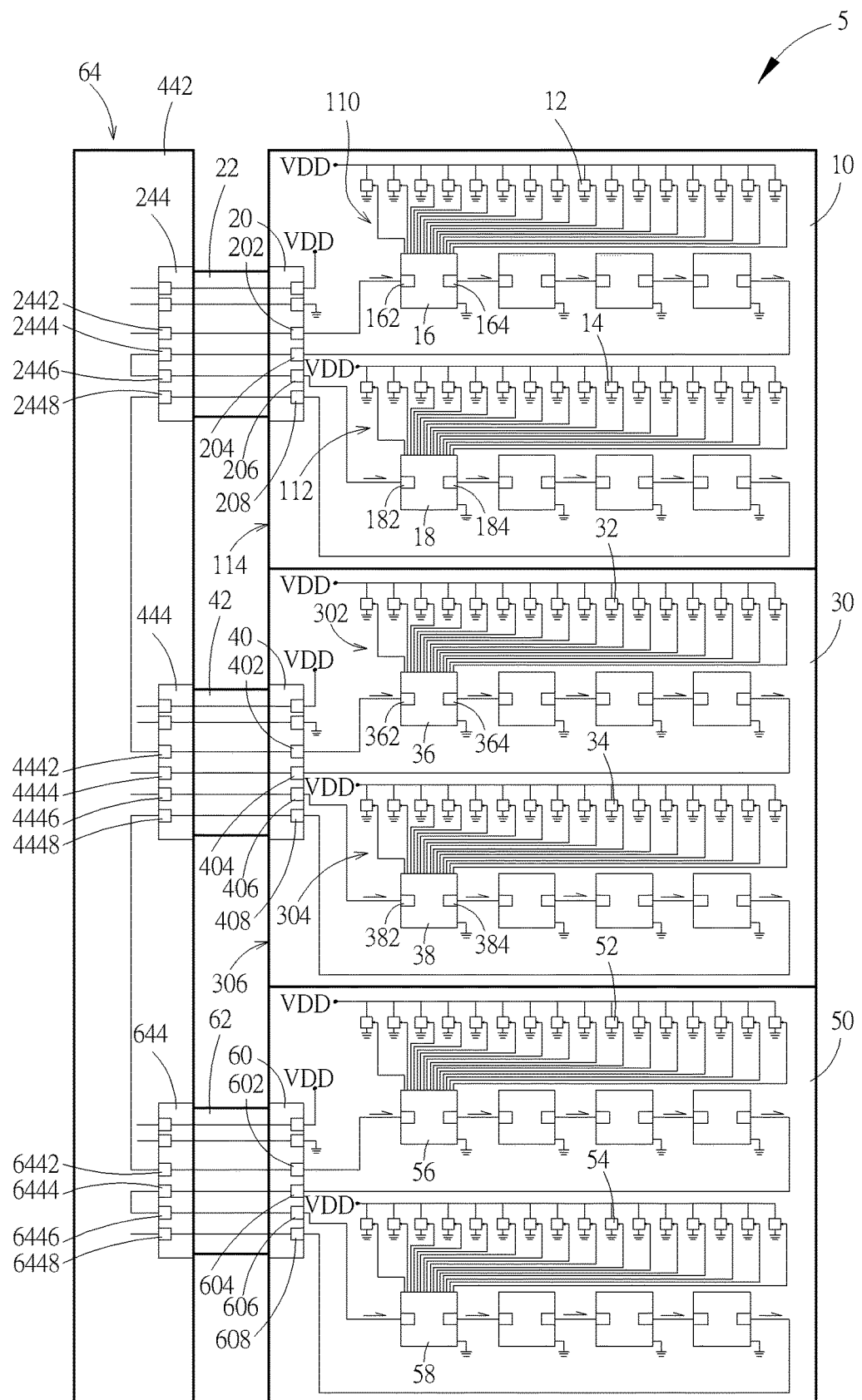
FIG. 11 is a functional block diagram of a backlight apparatus according to another embodiment.

Please refer to FIG. 11, which illustrates a backlight apparatus 5 of another embodiment. The backlight apparatus 3 is structurally equal to an expansion of the backlight apparatus 3. For simplification of description, the backlight apparatus 5 uses the reference numbers of the backlight apparatuses 1 and 3 in principle. For other descriptions about the backlight apparatus 5, please refer to the relevant descriptions of the components of the backlight apparatuses 1 and 3 in the same name, which will not be repeatedly described. Compared with the backlight apparatus 3, the backlight apparatus 5 further includes a third circuit board 50, a plurality of fifth light sources 52, a plurality of sixth light sources 54, a fifth light source driver 56, a sixth light source driver 58, a third connector 60, and a third connection cable 62. The control board 64 of the backlight apparatus 5 further includes a third mating connector 644 disposed on the carrier board 642 thereof and matching the second connector 60. The fifth light sources 52, the sixth light sources 54, the fifth light source driver 56, the sixth light source driver 58, and the third connector 60 are disposed on the third circuit board 50. The third connection cable 62 connects the third connector 60 and the third mating connector 644. In the embodiment, the third circuit board 50 is structurally equal to the first circuit board 10 in principle. The connection relationship of the second circuit board 50 with other components thereon is similar to that of the first circuit board 10 with other components thereon. Therefore, for other descriptions about the second circuit board 50 and the other components thereon (including the connection relationship thereof), please refer to the relevant descriptions of the first circuit board and the other components thereon (including the connection relationship thereof) and the relevant figures. Furthermore, the third connector 60 has a ninth connection port 602, a tenth connection port 604, an eleventh connection port 606, and a twelfth connection port 608. The third mating connector 644 has a ninth mating connection port 6442, a tenth mating connection port 6444, an eleventh mating connection port 6446, and a twelfth mating connection port 6448, which correspond to the ninth connection port 602, the tenth connection port 604, the eleventh connection port 606, and the twelfth connection port 608 respectively and are connected thereto through the third connection cable 62. The ninth connection port 602, the fifth light source driver 56, and the tenth connection port 604 are electrically coupled in series. The eleventh connection port 606, the sixth light source driver 58, and the twelfth connection port 608 are electrically coupled in series.

Similarly, in the backlight apparatus 5 shown by FIG. 11, connecting mating connection ports on the control board 64 can achieve electrical series connection of the light source drivers in practice. For other examples therefor, please refer to the relevant descriptions in the foregoing. In the embodiment, the second mating connection port 2444 and the third mating connection port 2446 are connected. The fourth mating connection port 2448 and the fifth mating connection port 4442 are connected. The first to third control signals are coded into the first data stream DS1. Thereby, the first light source driver 16, the second light source driver 18, and the third light source driver 36 are electrically coupled in series. The first light source 12, the second light sources 14, and the third light sources 32 are controlled to emit light according to the first data stream DS1. Furthermore, the eighth mating connection port 4448 and the ninth mating connection port 6442 are connected. The tenth mating connection port 6444 and the eleventh mating connection port 6446 are connected. The fourth to sixth control signal are coded into the fourth data stream D54. Thereby, the fourth light source driver 38, the fifth light source driver 56, and the sixth light source driver 58 are electrically coupled in series. The fourth light source 34, the fifth light source 52, and the sixth light source 54 are controlled to emit light according to the fourth data stream D54.

From another aspect, although the first, second and third circuit boards 10, 30 and 50 are spliced to form a circuit board with larger area, connecting mating connection ports on the control board 64 can form a control area in logic. As shown by FIG. 11, the backlight area provided by the backlight apparatus 5 is divided into two control areas. The first light source 12, the second light source 14, and the third light source 32 belong to one of the control areas and are controlled through the first data stream DS1. The fourth light source 34, the fifth light source 52, and the sixth light source 54 belong to the other control area and are controlled through the fourth data stream DS4. In practice, this configuration is equivalent to a case that the back light provided by the backlight apparatus 5 is divided into an upper control area and a lower control area. This feature is conducive to planning the data streams and also can enhance the flexibility in controlling the light sources.

Figure 12:
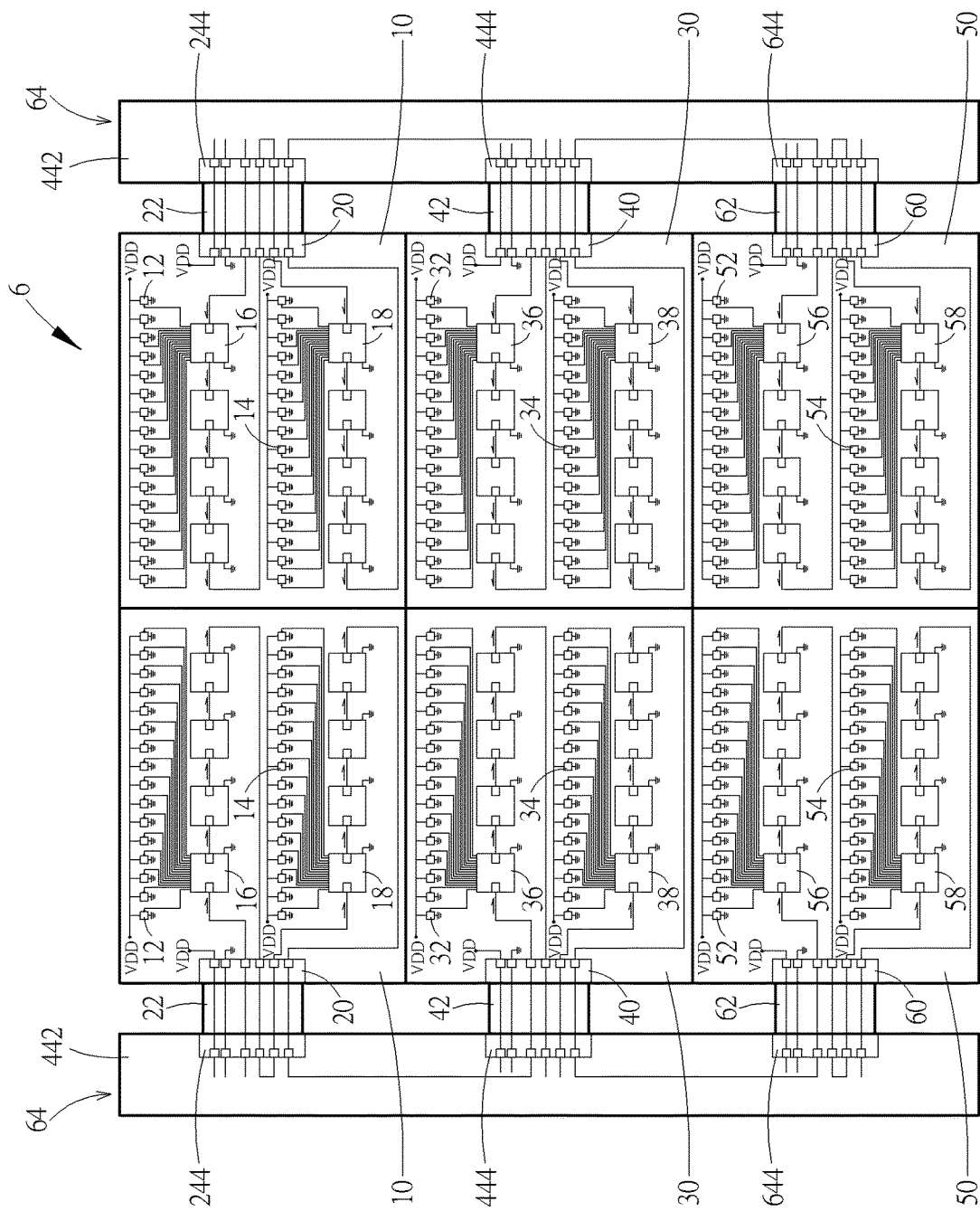
FIG. 12 is a functional block diagram of a backlight apparatus according to another embodiment.

In addition, in the embodiment, the first, second and third circuit boards 10, 30 and 50 of the backlight apparatus 5 are spliced in a single direction. In practice, it is practicable to splice more circuit boards in two directions to form a circuit board with larger area in logic, or to arrange two sets of the configuration in FIG. 11 oppositely (i.e. left and right symmetrical). As shown by FIG. 12, the configuration shows a backlight apparatus 6 which is equivalent to a combination of two backlight apparatuses 5 (e.g. the configuration shown in FIG. 11) arranged oppositely, which illustrates a 3×2 circuit board array accordingly that provides back light in four areas. For simplification of description and drawing, the backlight apparatus 6 uses the reference numbers of the backlight apparatus 5 and also skips some reference numbers. For other descriptions about the backlight apparatus 6, please refer to the relevant descriptions of the components of the backlight apparatus 5 in the same name, which will not be repeatedly described. For example, the backlight apparatus 6 is applied to an LCD television of large size with direct-type backlight. The backlight is provided by splicing six circuit boards of relatively small area (i.e. the circuit boards 10, 30 and 50). Two control boards 64 are disposed at the left and right sides of the 3×2 circuit board array. If required, the two control boards 64 can be moved to the back side of the six circuit boards by bending the connection cables. Thereby, (a) in the mechanism design, the LCD television can be designed to be with left and right narrow borders. For this case, the thickness of the LCD television is about the sum of the thickness of the circuit board 10 and the thickness of control board 64, which is conducive to the design of thin thickness of the LCD television. (b) In the circuit design, the length of the longest one of the signal paths from the control board 64 to the LED light sources can be reduced effectively, which can avoid a case that relevant signals sent by the control board 64 disposed at the left side of the 3×2 circuit board array need to be transmitted across the whole width of the circuit board array to drive the LED light sources at the right side of the 3×2 circuit board array.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight apparatus, comprising:
   a first circuit board, having a first front surface, a first rear surface, a plurality of first vias, a plurality of second vias, a plurality of first driving signal paths, and a plurality of second driving signal paths, the plurality of first driving signal paths passing through the plurality of first vias correspondingly to extend on the first front surface, the plurality of second driving signal paths passing through the plurality of second vias correspondingly to extend on the first front surface;
   a plurality of first light sources, disposed on the first front surface, the plurality of first light sources corresponding to the plurality of first driving signal paths respectively;
   a first light source driver, disposed on the first rear surface and electrically coupled to the plurality of first light sources through the corresponding first driving signal paths, the first light source driver having a first input port and a first output port;
   a plurality of second light sources, disposed on the first front surface, the plurality of second light sources corresponding to the plurality of second driving signal paths respectively;
   a second light source driver, disposed on the first rear surface and electrically coupled to the plurality of second light sources through the corresponding second driving signal paths, the second light source driver having a second input port and a second output port;
   a first connector, disposed on the first rear surface and having a first connection port, a second connection port, a third connection port, and a fourth connection port, the first connection port, the first input port, the first output port, and the second connection port being electrically coupled in series, the third connection port, the second input port, the second output port, and the fourth connection port being electrically coupled in series;
   a first connection cable; and
   a control board, disposed adjacent to the first circuit board and connected to the first circuit board through the first connection cable, the control board outputting electrical power, a first data stream, and a second data stream through the first connection cable;
   wherein the first input port receives the first data stream through the first connection port, the first output port transmits the first data stream to the second connection port, the first light source driver decodes the first data stream to obtain a first control signal and controls the plurality of first light sources to emit light through the corresponding first driving signal paths according to the first control signal;
   wherein the second input port receives the second data stream through the third connection port, the second output port transmits the second data stream to the fourth connection port, the second light source driver decodes the second data stream to obtain a second control signal and controls the plurality of second light sources to emit light through the corresponding second driving signal paths according to the second control signal.

2. The backlight apparatus, according to claim 1, wherein the control board comprises a first mating connector, the first mating connector and the first connector are connected through the first connection cable, the first mating connector has a second mating connection port and a third mating connection port, the second mating connection port and the second connection port are connected through the first connection cable, the third mating connection port and the third connection port are connected through the first connection cable, and the second mating connection port and the third mating connection port are connected.

3. The backlight apparatus, according to claim 1, further comprising a second circuit board, a plurality of third light sources, a third light source driver, a second connector, and a second connection cable, wherein the second circuit board and the first circuit board are arranged side by side, the second circuit board has a second front surface, a second rear surface, a plurality of third vias, and a plurality of third driving signal paths, the plurality of third driving signal paths pass through the plurality of third vias correspondingly to extend on the second front surface, the plurality of third light sources are disposed on the second front surface and correspond to the plurality of third driving signal paths respectively, the third light source driver is disposed on the second rear surface and electrically coupled to the plurality of third light sources through the corresponding third driving signal paths, the third light source driver has a third input port and a third output port, the second connector is disposed on the second rear surface and has a fifth connection port and a sixth connection port, the fifth connection port, the third input port, the sixth connection port, and the third output port are electrically coupled in series, the second connection cable connects the second connector and the control board, the control board outputs electrical power and a third data stream through the second connection cable, the third input port receives the third data stream through the fifth connection port, the third output port transmits the third data stream to the sixth connection port, and the third light source driver decodes the third data stream to obtain a third control signal and controls the plurality of third light sources to emit light through the corresponding third driving signal paths according to the third control signal.

4. The backlight apparatus, according to claim 3, wherein the control board comprises a second mating connector, the second mating connector and the second connector are connected through the second connection cable, the second mating connector has a fifth mating connection port, the fifth mating connection port and the fifth connection port are connected through the second connection cable, the first mating connector has a fourth mating connection port, the fourth mating connection port and the fourth connection port are connected through the first connection cable, and the fourth mating connection port and the fifth mating connection port are connected.

5. The backlight apparatus, according to claim 3, wherein the first circuit board has a first edge, the first connector is disposed adjacent to the first edge, the second circuit board has a second edge, the second connector is disposed adjacent to the second edge, and the first edge is aligned with the second edge.

6. The backlight apparatus, according to claim 1, further comprising a second circuit board, a plurality of third light sources, a third light source driver, a second connector, and a second connection cable, wherein the control board comprises a first mating connector and a second mating connector, the first mating connector and the first connector are connected through the first connection cable, the second mating connector and the second connector are connected through the second connection cable, the first mating connector has a fourth mating connection port, the fourth mating connection port and the fourth connection port are connected through the first connection cable, the second circuit board and the first circuit board are arranged side by side, the second circuit board has a second front surface, a second rear surface, a plurality of third vias, and a plurality of third driving signal paths, the plurality of third driving signal paths pass through the plurality of third vias correspondingly to extend on the second front surface, the plurality of third light sources are disposed on the second front surface corresponding to the plurality of third driving signal paths respectively, the third light source driver is disposed on the second rear surface and electrically coupled to the plurality of third light sources through the corresponding third driving signal paths, the second connector is disposed on the second rear surface and has a fifth connection port and a sixth connection port, the third light source driver has a third input port and a third output port, the fifth connection port, the third input port, the third output port, and the sixth connection port are electrically coupled in series, the second mating connector has a fifth mating connection port, the fifth mating connection port and the fifth connection port are connected through the second connection cable, the fifth mating connection port and the fourth mating connection port are connected, the control board outputs electrical power and the second data stream through the second connection cable, the third input port receives the second data stream through the fifth connection port, the third output port transits the second data stream to the sixth connection port, and the third light source driver decodes the second data stream to obtain a third control signal and controls the plurality of third light sources to emit light through the corresponding third driving signal paths according to the third control signal.

7. The backlight apparatus, according to claim 6, further comprising a plurality of fourth light sources and a fourth light source driver, wherein the second connector has a seventh connection port and a eighth connection port, the second mating connector has a sixth mating connection port and a seventh mating connection port, the sixth mating connection port and the sixth connection port are connected through the second connection cable, the seventh mating connection port and the seventh connection port are connected through the second connection cable, the second circuit board has a plurality of fourth vias and a plurality of fourth driving signal paths, the plurality of fourth driving signal paths pass through the plurality of fourth vias correspondingly to extend on the second front surface, the plurality of fourth light sources are disposed on the second front surface corresponding to the plurality of fourth driving signal paths respectively, the fourth light source driver is disposed on the second rear surface and electrically coupled to the plurality of fourth light sources through the corresponding fourth driving signal paths, the fourth light source driver has a fourth input port and a fourth output port, the seventh connection port, the fourth input port, the fourth output port, and the eighth connection port are electrically coupled in series, the sixth mating connection port and the seventh mating connection port are connected, the fourth input port receives the second data stream through the seventh connection port, the fourth output port transmits the second data stream to the eighth connection port, and the fourth light source driver decodes the second data stream to obtain a fourth control signal and controls the plurality of fourth light sources to emit light through the corresponding fourth driving signal paths according to the fourth control signal.

8. The backlight apparatus, according to claim 6, wherein the first circuit board has a first edge, the first connector is disposed adjacent to the first edge, the second circuit board has a second edge, the second connector is disposed adjacent to the second edge, and the first edge is aligned with the second edge.

\* \* \* \* \*